United States Patent [19]

Helgorsky et al.

[11] 4,241,029

[45] Dec. 23, 1980

[54] LIQUID/LIQUID EXTRACTION OF GALLIUM VALUES FROM BASIC AQUEOUS SOLUTIONS THEREOF

[75] Inventors: Jacques Helgorsky, Frepillon; Alain Leveque, Paris, both of France

[73] Assignee: Rhone-Poulenc Industries, Paris, France

[21] Appl. No.: 969,470

[22] Filed: Dec. 14, 1978

[30] Foreign Application Priority Data

Dec. 15, 1977 [FR] France .................. 77 37785

[51] Int. Cl.³ ............................................. C01G 15/00
[52] U.S. Cl. .................................. 423/112; 75/101 BE
[58] Field of Search ................... 423/112, 658.5; 75/101 BE

[56] References Cited

U.S. PATENT DOCUMENTS

| 3,637,711 | 1/1972 | Budde et al. ............... 75/101 BE |
| 3,920,450 | 11/1975 | Katsura ...................... 423/112 |
| 3,971,843 | 7/1976 | Helgorsky et al. ........... 423/112 |

FOREIGN PATENT DOCUMENTS

| 2743475 | 3/1978 | Fed. Rep. of Germany ......... 423/112 |
| 49-42765 | 11/1974 | Japan ............................ 423/112 |

*Primary Examiner*—Herbert T. Carter
*Attorney, Agent, or Firm*—Burns, Doane, Swecker & Mathis

[57] ABSTRACT

Gallium values are recovered from basic aqueous solutions thereof, especially from sodium/aluminum liquors of Bayer process origin, by liquid/liquid extraction with a water immiscible organic phase comprising an organic solvent and, dissolved therein, an organic-solvent-soluble substituted hydroxyquinoline and an organic carboxylic acid compound.

17 Claims, No Drawings

LIQUID/LIQUID EXTRACTION OF GALLIUM VALUES FROM BASIC AQUEOUS SOLUTIONS THEREOF

BACKGROUND OF THE INVENTION

1. Field of the Invention

The present invention relates to a method for the liquid/liquid extraction and recovery of gallium from basic aqueous solutions.

2. Description of the Prior Art

A process for recovering gallium from basic aqueous alkaline solution by means of liquid/liquid extraction is known from the French patent application Nos. 2,277,897, 2,307,047 and 2,307,882. According to this process which is also described and patented in our previously issued U.S. Pat. No. 3,971,843, hereby expressly incorporated by reference and relied upon, gallium present in aqueous alkaline solutions which also contain compounds of aluminum and sodium is recovered by liquid/liquid extraction using substituted hydroxyquinolines. The patented method is especially adapted for the recovery of the gallium present in sodium aluminate lyes originating from the Bayer process, utilizing certain 8-hydroxyquinolines. The gallium recovery method described in the aforementioned patent includes a stage of extraction proper and a stage where the solvent is regenerated and the gallium recovered by means of strong acids. There are several preferred embodiments for carrying out the subject process, depending, on the one hand, on the acid used and its concentration in the stage where the solvent charged with the gallium values is regenerated; on the other hand, the process parameters can be said to depend on the desired purity of the gallium values sought to be recovered.

In the first embodiment, a preferred method of recovering the gallium present in very basic aqueous solutions also containing compounds of aluminum and sodium includes the following stages:

[i] contacting the aqueous solution with a water-insoluble substituted hydroxyquinoline in solution in a water-insoluble organic solvent comprising the halogenated or non-halogenated aliphatic and aromatic hydrocarbons, whereby the gallium and a certain amount of sodium and aluminum values are extracted from the aqueous phase to the organic phase;

[ii] separating the organic phase from the aqueous phase;

[iii] contacting the organic phase with a dilute aqueous solution of an acid to extract the sodium and aluminum from the organic phase, the gallium values remaining in solution in the said organic phase;

[iv] separating the organic phase from the aqueous phase and next contacting the remaining organic phase with a more concentrated aqueous acid solution, to transfer the gallium from the organic phase into the aqueous phase; and thence

[v] separating the gallium values from the aqueous phase.

The acids used are preferably hydrochloric, sulfuric and nitric. The concentration of the dilute aqueous acid solution is preferably from 0.2 M to 0.5 M, and the concentration of the more concentrated aqueous acid solution is preferably greater than 1.6 M. But in those cases where hydrochloric acid is used, the concentration is preferably from 1.3 M to 2.2 M, and more preferably from 1.6 M to 1.8 M.

In a second embodiment, another preferred method of recovering the gallium values comprises the following stages:

[a] contacting the aqueous solution with a water-insoluble substituted hydroxyquinoline in solution in a water-insoluble organic solvent comprising the halogenated or non-halogenated aliphatic and aromatic hydrocarbons, whereby the gallium and a certain amount of sodium and aluminum values are extracted from the aqueous phase to the organic phase;

[b] separating the organic phase from the aqueous phase;

[c] contacting the organic phase with a concentrated aqueous solution of an acid capable of chelating (complexing) the gallium in anionic form, the gallium values remaining in solution in the organic phase while the sodium and aluminum values transfer into the aqueous phase;

[d] separating the organic phase from the aqueous phase and contacting the remaining organic phase with a dilute aqueous acid solution, whereby the gallium values in the organic phase transfer to the aqueous phase; and

[e] separating the gallium values from the aqueous phase.

The acids used are preferably hydrochloric and hydrobromic acid. The concentration of the concentrated acid solution is preferably from 5 M to 8 M, and that of the dilute solution from 1.3 M to 2.2 M.

Further, it too is feasible, if it be acceptable to obtain the gallium values in a less purified state, to conduct the operation in the following seriatim fashion:

[1] contacting the aqueous solution with a water-insoluble substituted hydroxyquinoline in solution in a water-insoluble organic solvent comprising the halogenated or non-halogenated aliphatic and aromatic hydrocarbons, whereby the gallium values and a certain amount of sodium and aluminum values are extracted from the aqueous phase to the organic phase;

[2] separating the organic phase from the aqueous phase;

[3] contacting the organic phase with an aqueous solution of an acid to transfer the gallium, sodium and the aluminum values in the organic phase to the aqueous phase;

[4] separating the aqueous phase from the organic phase; and

[5] recovering the gallium, sodium and aluminum values.

The acid solutions used are preferably either solutions of sulfuric or nitric acids in a concentration of greater than about 1.6 M, or hydrochloric or hydrobromic acids in a concentration from 1.3 M to 2.2 M.

In the gallium extracting stage described in the aforementioned patent, it may be advantageous to add substances with an alcohol function, e.g., heavy alcohols such as N-decanol and isodecanol, and various heavy phenols, as well as various other solvating compounds, e.g., certain phosphoric esters such as tributyl phosphate, in the organic extraction phase, in known manner.

The concentration of substituted hydroxyquinoline in the organic phase is not critical and may vary over wide limits; indeed the same need not be very high, for even a concentration as low as 1% affords good extraction of gallium, due to the far greater affinity of these chelating agents for gallium than for aluminum and sodium; in practice, however, typical concentrations are in the range of from 1% to 50% by volume, with respect to the organic phase, and concentrations of from 6% to 12% have been found to be especially economical.

The topic hydroxyquinolines, moreover, may be employed singly or in any admixture.

Furthermore, although temperature is not a critical parameter for obtaining good results by the method described in our U.S. Pat. No. 3,971,843, it is advantageous for the extraction stage to be carried out at a fairly high temperature, in practice below 100° C., and preferably from 50° to 80° C. It may be added that, in industrial practice, the solutions generally treated are aluminate solutions from the Bayer process, particularly those which are art characterized as "decomposed", which are at a temperature in the vicinity of 50° C., and, although this temperature is less favorable than a higher one, it is nevertheless sufficient to afford satisfactory extraction yields. Moreover, the stage where the solvent is regenerated and the gallium values recovered is carried out in such a way that the organic phase is treated with an acid solution to recover the gallium, at a temperature below that of the extraction stage and preferably near ambient temperature.

The very basic solutions treated by the methods described are notably those in which the $OH^-$ concentration may be as high as 13–14 g ions/l. Thus, the caustic sodium aluminate lyes from the Bayer process, which are preferably treated by this method, generally have a composition corresponding to:

$Na_2O$: from 100 to 400 g/l
$Al_2O_3$: from 40 to 150 g/l while the so-called "decomposed" caustic solutions typically display such compositions as:

$Na_2O$: from 150 to 200 g/l
$Al_2O_3$: from 70 to 100 g/l

In industry, installations used for this method are typically assembled as follows. The sodium aluminate solution, with its alumina content reduced following its "decomposition" and the organic phase comprising the selected chelating agent, a solvent and, optionally, the compounds bearing an alcohol function and other solvating compounds are charged into a first counter-current extraction apparatus. A large proportion of the gallium values transfer into the organic phase, the proportion depending upon the respective rates of flow of the two liquids. Aluminum, sodium and certain impurities also transfer into the organic phase. In another extraction apparatus, the resulting organic phase is contacted with a first regenerating solution, comprising a dilute strong acid or a concentrated strong chelating acid; in both instances this leaves virtually only gallium values in the organic phase. The latter organic phase is then treated in a third countercurrent extraction apparatus, whereat it is contacted with a strong acid for the purpose of recovering the gallium, and is then washed with water before the organic phase is recycled into the first countercurrent extraction apparatus. The acid solution, which now includes the gallium values, is then treated to complete its purification; thence the gallium values are extracted therefrom.

Further, a simple commercial installation can be utilized if it be desired to recover less purified gallium values. Such an apparatus may include a first extraction apparatus as described hereinabove, at the outlet of which the organic phase is treated in a countercurrent extraction apparatus where it contacts a solution of a strong acid for the purpose of recovering the gallium, sodium and aluminum.

It had also been found, however, that extended use of alkenyl-8-hydroxyquinoline in a gallium extracting unit by the methods described in the aforementioned patent ultimately resulted in their gradual degradation, thus effecting a reduction in their extracting power.

In our copending application, Ser. No. 824,068, filed Aug. 12, 1977, hereby expressively incorporated by reference and relied upon, there is disclosed a certain group of hydroxyquinolines which were found to be particularly stable, which did not deteriorate over prolonged periods of time, and which retained the noted and notable initial properties of the alkenyl-8-hydroxyquinolines as described in our earlier patent for extracting gallium from sodium aluminate lyes.

The invention disclosed in our 824,068 application reflects an important improvement over the process of our earlier patent acid compounds containing at least one carboxylic acid group to the organic phase improves the speed of the gallium extraction in a process as disclosed in our U.S. Pat. No. 3,971,843 and/or our U.S. Patent application Ser. Nos. 824,063 and/or 923,644, without affecting the excellent extraction rates of said gallium.

The basic aqueous solutions which are treated according to the process of the present invention are those wherein the $OH^-$ concentration may amount to up to 13–14 ions g/l. Thus, the process of the invention is particularly suitable for the extraction of gallium contained in the sodium aluminate liquors of the Bayer process for the production of alumina. The compositions of such liquors generally correspond to $Na_2O$ contents of between 100 and 400 g/l and an $Al_2O_3$ content of 40 to 150 g/l, whereby the composition of the so-called "attack" liquors generally corresponds to $Na_2O$ contents of about 300 g/l and an $Al_2O_3$ content of about 150 g/l and the composition of the so-called "decomposed" liquors generally corresponds to $Na_2O$ contents of between about 150 and about 200 g/l and $Al_2O_3$ contents of between about 70 and 100 g/l. The organic solvents employed according to the invention are diluents which are conventionally used in liquid/liquid extraction. They may be used singly or in mixtures. Among them, the following may be cited: aliphatic hydrocarbon compounds such as, for example, heptane and petroleum fractions of the kerosene type; aromatic hydrocarbon compounds such as, for example, benzene, toluene, xylene and fractions of the SOLVESSO (trademark of the EXXON Corp.) type, and, finally, halogenated derivatives of said compounds, for example, chloroform and carbon tetrachloride.

Solvent-soluble hydroxyquinolines which are employed in the process according to the invention are hydroxyquinolines which are capable of extracting gallium by means of complexing under the conditions of the process according to the invention. Furthermore, they must be more soluble under these conditions in the organic phase than in the aqueous phase. Suitable hydroxyquinolines are disclosed in our U.S. Pat. No. 3,971,843. Particularly suitable substituted hydroxyquinolines for the purposes of the invention are those of the general formula:

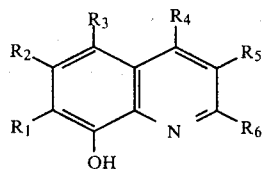

wherein $R_1$, $R_2$, $R_3$, $R_4$, $R_5$ and $R_6$ may be the same or different from each other, and each represent hydrogen or a hydrocarbon group selected from the group consisting of alkyl, alkenyl, cycloaliphatic and aromatic groups, which groups may be unsubstituted or substituted, with the proviso that not all of $R_1$, $R_2$, $R_3$, $R_4$, $R_5$ $R_6$ represent H. Preferably, the hydroxyquinolines are monosubstituted in α- or β-position to the hydroxy group. The sum of the carbon atoms within the substituents preferably is in the range of from about 2 to about 20. If the hydrocarbon groups are substituted, they are preferably selected from the group consisting of fluorine, bromine, chlorine. Among substituted hydroxyquinolines, particularly suitable for the purposes of the invention are the α-alkenylhydroxy-8-quinolines, the β-alkenylhydroxy-8-quinolines, and the alkylhydroxy-8-quinolines wherein R represents hydrogen or a hydrocarbon group. α-alkenylhydroxy-8-quinolines which are preferred within the process according to the present invention have the formula

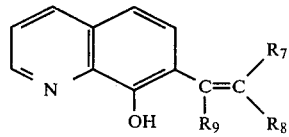

wherein $R_7$, $R_8$, and $R_9$ represent hydrogen or a hydrocarbon group, which may be substituted. Among the latter particularly those of the following formula are used:

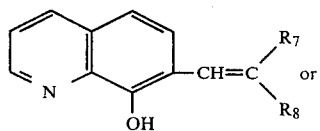

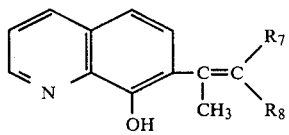

The β-alkenylhydroxy-8-quinolines which are preferred within the process according to the invention have the formula

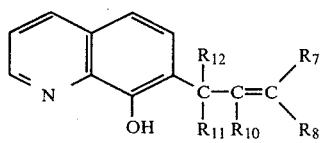

wherein $R_7$, $R_8$, $R_{10}$, $R_{11}$ and $R_{12}$ each represent hydrogen or a hydrocarbon group which may be substituted.

The alkylhydroxy-8-quinolines which are preferred within the process according to the invention have the formula

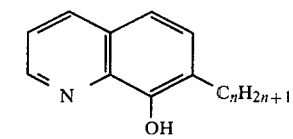

wherein n is comprised between 1 and 20, and preferably between 5 and 15. The hydroxyquinolines may be used within the process according to the invention singly or in mixtures.

The amount of substituted hydroxyquinoline in the organic phase is not critical and may vary within wide limits. However, an amount of between about 1 and about 50% by volume relative to the volume of the organic phase is generally suitable, and an amount of between about 6 and about 12% is economically favorable.

The organic carboxylic acid compounds containing at least one carboxylic acid group which may be used according to the invention are those utilizable in liquid/liquid extractions. They may be aliphatic or aromatic, linear or branched carboxylic acids, and, possibly, may be substituted. Suitably, the carboxylic acid comprises a hydrocarbon moiety of between about 3 and about 20 carbon atoms. Monocarboxylic acids are preferred. However, dicarboxylic acids are also suitable. The hydrocarbon moiety of the carboxylic acid may be further substituted by substitutents selected from the group consisting of fluorine, chlorine, bromine.

They may be employed singly or in a mixture. Furthermore, they must be more soluble in the organic phase than in the aqueous phase under the conditions of the process of the invention.

Among these compounds, the following may be cited specifically: aliphatic carboxylic acids wherein the hydrocarbon moiety has about 3 to about 20 carbon atoms, in particular, butanoic acid, valeric acid, octoic acid, caproic acid, caprylic acid, capric acid, pelargonic acid, lauric acid; aliphatic, aromatic, or cycloaliphatic. Halogenated carboxylic acids such as, for example, alpha bromolauric acid;

naphthenic acids of the formula

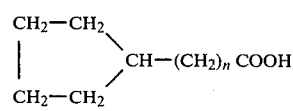

wherein n is $\geq 1$; in particular, 1 to 15 heavy acid fractions containing particularly mixtures of $C_5$-$C_6$, $C_7$-$C_9$, $C_9$-$C_{11}$, $C_{10}$-$C_{13}$ and $C_{12}$-$C_{16}$ carboxylic acids.

diacids of the formula

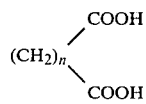

wherein $n \geq 1$; in particular 1 to 20 thioglycolic acids of the general formula of R-S-$CH_2$-COOH wherein R is an aliphatic, cycloaliphatic, or aromatic group or a combination of such groups.

"VERSATIC" (trademark of the SHELL CHEMICALS CO.) acids having the formula of

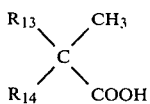

wherein $R_{13}$ and $R_{14}$ are substituted or nonsubstituted hydrocarbon groups, and in particular, the acid "VERSATIC 911" (trademark of SHELL CHEMICALS) which is a mixture of saturated tertiary, monocarboxyic acids wherein $R_1$ and $R_2$ are hydrocarbon groups, wherein the total number of carbon atoms of the two groups 6, 7 or 8, said acids being produced by means of oxo synthesis from $C_9$-$C_{11}$ olefins; the "VERSATIC 15/19" acid (trademark of SHELL CHEMICALS) wherein $R_1$ is hexyl and $R_2$ is octyl; the acid "VERSATIC 10" (trademark of SHELL CHEMICALS) obtained by means of the SHELL $C_9$-olefine carboxylation process, wherein $R_1$ and $R_2$ are hydrocarbon groups and the total number of carbon atoms of the two groups is 7.

The amount of the organic carboxylic acid compound containing at least one carboxylic acid group in the organic phase is not critical and may vary within wide limits. However, an amount of less than 20% by volume relative to the volume of the organic phase is generally suitable; a proportion between 0 (excluded) and 10% being economically favorable.

Within the process according to the present invention it may be advantageous to further add to the organic phase various modifying agents which are conventionally used in the field of liquid/liquid extraction. Among these, the following may be cited: alcoholic compounds, in particular, heavy alcohols containing between about 4 and about 15 carbon atoms, and heavy phenols, together with other solvating compounds, such as certain phosphoric esters, such as tri-butyl phosphate, phosphine oxides and sulfoxides.

The temperature during the extraction according to the invention is not critical. Indeed it is an advantage of the process according to the present invention in comparison with the prior art that the extraction may be performed at any temperature. Thus, generally, an extraction temperature of between about 10° C. and about 50° C. will produce highly satisfactory gallium rates.

The nature of the atmosphere wherein the process of the invention is performed is not critical. However, if it is desired to avoid or minimize degradation of the extracting agent by oxidation, it is advantageous within the process according to the present invention, to carry out the extraction in an inert atmosphere. The inert atmosphere may consist in particular of an argon or nitrogen atmosphere.

In order to recover the gallium from basic aqueous solutions by means of the process according to the present invention, the extraction stage as such is followed by a stage of regenerating the organic phase by means of strong acids. Thus, the present invention also relates to a process for liquid/liquid extraction of gallium contained in basic aqueous solutions by contacting the basic aqueous solution with an organic phase comprising an organic solvent, at least one substituted hydroxyquinoline and at least one organic carboxylic acid compound containing at least one carboxylic acid group, wherein, subsequent to the extraction of the basic aqueous solution, the obtained gallium-containing organic phase is treated at least once with an aqueous solution of a strong acid, and, the residual organic phase is separated from the aqueous acid solution and subsequently the gallium is recovered from the aqueous acid solution. The treatment of organic phase with an acidic aqueous solution and the recovery of the gallium are suitably carried out as disclosed in our U.S. Pat. No. 3,971,843. The strong acids which may be used are preferably chosen from the group comprising: hydrochloric acid, sulfuric acid, bromohydric acid and perchloric acid.

In the particular case wherein the basic aqueous solution is a sodium aluminate liquor of the Bayer process for the production of alumina, it is observed that, in addition to the gallium, part of the amount of aluminum and sodium contained in the basic liquor is transferred from the liquor to the organic phase in the course of the extraction step according to the invention. In this case, the subsequent regeneration step leads to the recovery of a more or less pure gallium according to different embodiments of the regenerative and gallium recovering method.

According to a first embodiment, after the organic phase has been separated from the aqueous phase, the organic phase is contacted with an aqueous solution of a strong acid, the aqueous solution is separated from the organic phase and the gallium is recovered from the aqueous solution. the concentration of the acid solution used depends in particular on the amount of substituted hydroxyquinoline employed in the organic phase. In the case of the above-mentioned preferred amounts of hydroxyquinoline, the acid concentration in solutions of sulfuric, nitric or perchloric acids should preferably be higher than 1.2 M; if hydrochloric or hydrobromic acid is used, the acid concentration should preferably be between about 1.2 M and about 2.2 M.

According to a second embodiment, after separating the organic phase from the basic aqueous phase, the organic phase is contacted with a first dilute aqueous solution of an acid in order to transfer the sodium and the aluminum from the organic phase into the acid solution whilst the gallium is retained in the organic phase, and, after having separated the organic phase from the dilute aqueous acid solution, the residual organic phase is contacted with a second, more strongly concentrated aqueous solution of an acid in order to transfer the gallium from the organic phase into the second aqueous acid solution, from which it is subsequently recovered. The concentration of the acid solutions used depends, in particular, on the amount of substituted hydroxyquinoline employed in the organic phase. In the case of the above-mentioned preferred amounts of hydroxyquinoline, the acid concentration of the first aqueous acid solution is preferably between about 0.2 M and about 0.7 M; and the concentration of the secod aqueous acid solution is preferably higher than 1.2 M, when a solution of sulfuric acid or nitric acid or perchloric acid is used, and preferably between about 1.2 and about 2.2 M when a solution of hydrochloric or hydrobromic acid is employed.

According to a third embodiment, after the organic phase has been separated from the basic aqueous phase, the organic phase is contacted with a first concentrated aqueous solution of an acid which is capable of forming an anionic gallium complex which is retained dissolved in the organic phase while the sodium and the aluminum pass into the aqueous acid solution; subsequently, the organic phase is separated from the aqueous acid solution and then is contacted with a second more dilute solution of the acid in order to transfer the gallium from the organic phase into the aqueous solution, from which the gallium is subsequently separated. The acids used in this third embodiment are preferably hydrochloric acid or hydrobromic acid. The acid concentrations of the acid solutions depend in particular on the amount of substituted hydroxyquinoline employed in the organic phase. In the case of the above-mentioned preferred amounts of hydroxyquinoline, the concentration of the first solution is preferably between about 4 M and about 8 M, and that of the second solution between about 1.2 M and about 2.2 M.

The process according to the present invention may be carried out in conventional industrial facilities used in liquid/liquid extraction. By means of the present invention, it is, in particular, possible to reduce the size of the mixing reactors to a very considerable extent as compared with reactors used in a conventional procedure by benefitting from an important gain in productivity. It is thus possible, particularly by using a a multistage extraction system which requires less space and functions according to a counter current method, to achieve a nearly complete extraction of gallium from basic aqueous solutions.

Other advantages of the invention will appear from the examples which follow hereinafter; the examples, however, are not to be considered in any manner as limiting the invention.

EXAMPLE 1

A Bayer caustic liquor having a composition of 80 g/l $Al_2O_3$, 205 g/l $Na_2O$, 225 mg/l Ga, was agitated at 26° C. with an equal volume of an organic phase having the following composition:

| hydroxyquinoline A* | : | 8% by volume |
|---|---|---|
| n-decanol | : | 10% by volume |
| VERSATIC 10 acid | : | x% by volume |
| kerosene | : | (82 − x)% by volume |

*hydroxyquinoline A is a β-alkenyl-8-hydroxyquinoline of the formula

Following the separation of the phases, the rate of gallium extraction obtained is given in Table 1 as a function of mixing time and proportion of VERSATIC 10 acid employed.

TABLE 1

| Degree of gallium | Mixing time, mn. | | | | |
|---|---|---|---|---|---|
| Extraction in % | 2 | 5 | 10 | 20 | 30 |
| x% of | 0 | | | | 8 | 23 |
| VERSATIC 10 | 1 | 9 | 16 | 24 | 41 | 53 |
| acid | 2 | 38 | 62 | 76 | 89 | 89 |
| | 5 | 71 | 87 | 89 | 89 | 89 |

The results compiled in Table 1 show that a considerable increase in the speed of gallium extraction is achieved in the process of the invention, using a carboxylic acid as compared to the extraction speed in a conventional process (corresponding to x=0).

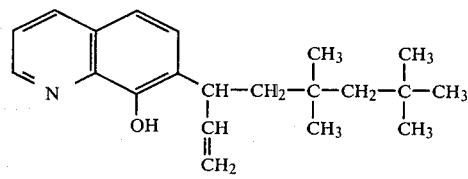

This is the active ingredient of the product marketed by the ASHLAND CHEMICAL CO. under the trademark KELEX 100.

EXAMPLE 2

This example again illustrates the increase of the speed of gallium extraction according to the process of the invention as compared to that in a conventional process (P.T.), when a hydroxyquinoline other than that of Example 1 is used.

A Bayer liquor of the composition recited in Example 1 is agitated at 50° C. with an equal volume of an organic phase having the following composition:

| hydroquinoline B** | 8% by volume |
|---|---|
| n-decanol | 10% by volume |
| VERSATIC acid 10 | x% by volume |
| kerosene | (82 − x)% by volume |

**hydroquinoline B is an alkylhydroxyquinoline of the formula

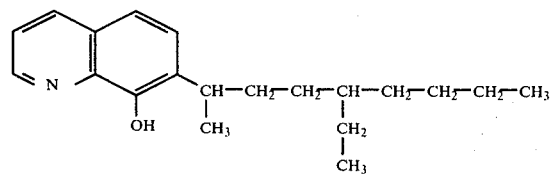

The degree of gallium extraction which is obtained after separation of the phases is given in Table 2 as a function of mixing time.

TABLE 2

| Degree of | | Mixing Time in mn | | | |
|---|---|---|---|---|---|
| Gallium Extraction | | 2 | 5 | 10 | 30 | 60 |
| x% of | x − 0 | | | | | |
| the acid | (P. T.) | 14 | 31 | 50 | 82 | 90 |
| | x − 1 | 45 | 74 | 87 | 90 | 90 |

EXAMPLE 3

This example illustrates again the increase of the speed of gallium extraction in the process of the invention as compared to that in a conventional process (P.T.), when octoic and naphthenic acids are used, together with another hydroxyquinoline.

A Bayer liquor of the composition given in Example 1 is agitated at 30° C. with an equal volume of an organic phase having the following composition:

| hydroxyquinoline C*** | : | 10% by volume |
|---|---|---|
| n-decanol | : | 10% by volume |
| octoic acid | | |
| or | | |
| naphthenic acid - | : | x% by volume |
| kerosene | : | (80 − x)% by volume |

***hydroxyquinoline C is an α-alkenyl hydroxyquinoline of the formula

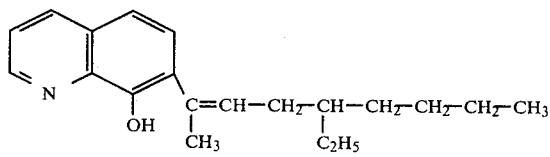

The degree of gallium extraction which is obtained after the separation of the phases is given in Table 3 hereinafter as a function of mixing time.

TABLE 3

| Degree of gallium Extraction | | Mixing time in mn | | | | |
|---|---|---|---|---|---|---|
| | | 2 | 5 | 10 | 20 | 30 |
| x% if the acid | 0 | | | | 18 | 33 |
| | 4% Octoic Acid | 78 | 86 | 86 | 86 | 86 |
| | 8% Naphthenic Acid | 27 | 47 | 68 | 78 | 86 |

EXAMPLE 4

The example illustrates one of the additional advantages provided by the process of the invention (P.T.) as compared to a conventional process without the addition of an organic carboxylic acid (P.T.), namely, the advantage that it is possible to carry out the extraction of gallium at any temperature, in particular, at ambient temperature while obtaining rapidly excellent gallium recovery yields.

A Bayer liquor of the composition given in Example 1 is agitated at 26° C. or at 50° C. with an equal volume of an organic phase having the following composition:

| hydroxyquinoline A* | : | 8% by volume |
|---|---|---|
| n-decanol | : | 10% by volume |
| VERSATIC 10 acid | : | 5% by volume |
| kerosene | : | 77% by volume |

The hydroxyquinoline A* is that described in Example 1.

The degree of gallium extraction which is obtained after the separation of the phases is given in Table 4 hereinafter as a function of mixing time and temperature.

TABLE 4

| Degree of gallium Extraction | | | Mixing time, mn | | | |
|---|---|---|---|---|---|---|
| | | | 1 | 2 | 5 | 10 |
| Temperature in °C. | 26° C. | P.I. | 50 | 71 | 87 | 89 |
| | | P.T. | | | | 8 |
| | 50° C. | P.I. | 80 | 88 | 89 | 89 |
| | | P.T. | | | 14 | 23 |

It is thus clearly apparent that regardless of the temperature of the extraction, the maximum gallium extraction rate is attained very rapidly by the process of the invention, whereas the conventional process requires both a high extraction temperature and a substantial mixing time.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for recovering gallium values contained in a basic aqueous solution by a liquid/liquid extraction comprising contacting the basic aqueous solution with a water immiscible organic phase comprising an organic solvent and dissolved therein an organic-soluble substituted hydroxyquinoline, whereby the gallium is extracted into the organic phase; separating the organic phase from the basic aqueous solution and recovering the gallium values from the organic phase, the improvement which comprises the organic phase further comprising dissolved therein an organic carboxylic acid compound.

2. The process as defined in claim 1, wherein the organic solvent is selected from the group consisting of heptane, petroleum fractions of the type of kerosene, benzene, toluene, xylene, chloroform, carbon tetrachloride, aromatic fractions, and mixtures thereof.

3. The process as defined in claim 1, wherein the organic-solvent-soluble substituted hydroxyquinoline is more soluble in the organic phase than in the basic aqueous phase.

4. The process as defined in claim 3, wherein the substituted hydroxyquinoline is a hydroxyquinoline which forms a complex with the gallium.

5. The process as defined in claim 3, wherein the hydroxyquinoline has the formula

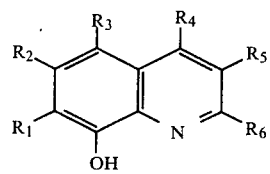

wherein $R_1$, $R_2$, $R_3$, $R_4$, $R_5$ and $R_6$ which may be the same or different from each other, each represent hydrogen or a hydrocarbon group selected from the group consisting of alkyl, alkenyl, cycloaliphatic and aromatic groups which hydrocarbon group is unsubstituted or substituted with the proviso that not all of $R_1$, $R_2$, $R_3$, $R_4$, $R_5$ or $R_6$ represent H.

6. The process as defined in claim 4, wherein the hydroxyquinoline is selected from the group consisting of α-alkenyl hydroxy-8-quinolines of the formula

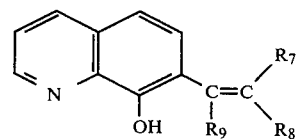

wherein $R_7$, $R_8$ and $R_9$ represent hydrogen or a hydrocarbon group, which is unsubstituted or substituted, β-alkenyl hydroxy-8-quinolines of the formula

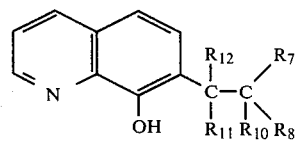

wherein $R_7$, $R_8$, $R_{10}$, $R_{11}$, $R_{12}$ represent a hydrogen or a hydrocarbon group which is unsubstituted or substituted, and alkyl hydroxy-8-quinolines of the formula

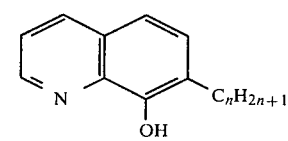

wherein n is comprised between 1 and 20.

7. The process as defined in claim 1, the organic phase comprises an amount of the substituted hydroxyquinoline of between about 1 and about 50% by volume relative to the volume of the organic phase.

8. The process as defined in claim 1, wherein the organic carboxylic acid compound is more soluble in the organic phase than in the aqueous phase and is selected from the group consisting of aliphatic and aromatic carboxylic acid compounds which are unsubstituted or substituted.

9. The process as defined in claim 8, wherein the organic carboxylic acid compound is selected from the group consisting of aliphatic carboxylic acids wherein the hydrocarbon moiety contains from about 3 to about 20 carbon atoms, halogenated aliphatic, aromatic or cycloaliphatic carboxylic acids, naphthenic acids of the formula

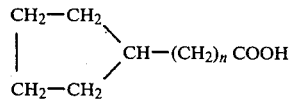

wherein n≧1, heavy acid comprising mixtures of $C_5$-$C_6$, $C_7$-$C_9$, $C_9$-$C_{11}$, $C_{10}$-$C_{16}$, $C_{10}$-$C_{13}$, and $C_{12}$-$C_{16}$ carboxylic acids diacids of the formula

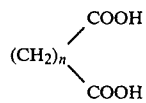

wherein n≧1, thioglycolic acids of the formula R—S—CH$_2$—COOH wherein R is an aliphatic, cycloaliphatic, aromatic group or a combination of said groups, an acid of the formula

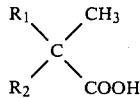

wherein $R_{13}$ and $R_{14}$ are substituted or nonsubstituted hydrocarbon groups and mixtures thereof.

10. The process as defined in claim 9, wherein the organic carboxylic acid compound comprises at least one carboxylic acid group and is selected from the group consisting of butanoic acid, valeric acid, octoic acid, caprilic acid, capric acid, pelargonic acid, lauric acid alpha bromolauric acid, naphthenic acid, an acid of the formula of

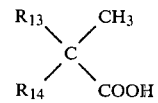

wherein $R_{13}$ is hexyl and $R_{14}$ is octyl or $R_1$ and $R_2$ each are hydrocarbon groups which together contain a total number of 7 carbon atoms and a mixture of acids of the same formula 19 wherein $R_{13}$ and $R_{14}$ are hydrocarbon groups which together contain a total number of carbon atoms of from 6 to 8.

11. The process as defined in claim 10, wherein the organic phase comprises an amount of the organic carboxylic acid of less than 20% by volume relative to the volume of the organic phase.

12. The process according to claim 11, the amount of carboxylic acid is comprised between 0 and about 10% by volume relative to the volume of the organic phase.

13. The process as defined in claim 1, wherein the organic phase further comprises a modifying agent selected from the group consisting of alcohols, phosphoric esters, phosphine esters and sulfoxides.

14. The process as defined in claim 13, wherein the modifying agent is selected from the group consisting of alcohols having between about 4 and about 15 carbon atoms and tri-butyl phosphate.

15. The process as defined in claim 1, which is performed in an inert atmosphere.

16. The process as defined by claim 1, which includes the steps of:

[i] contacting the aqueous basic solution with the organic phase, whereby gallium values are extracted from the basic aqueous solution into the organic phase;

[ii] separating the organic phase from the basic aqueous phase;

[iii] contacting the organic phase at least once with an aqueous solution of a strong acid, to extract the gallium values from the organic phase, into the aqueous acid solution;

[iv] separating the organic phase from the aqueous acid solution; and

[v] separating the gallium values from the aqueous acid solution.

17. The method as defined by claim 16, in which the acid is selected from the group consisting of hydrochloric, sulfuric, nitric acid, hydrobromic acid and perchloric acid.

* * * * *

UNITED STATES PATENT AND TRADEMARK OFFICE
CERTIFICATE OF CORRECTION

PATENT NO. : 4,241,029

DATED : December 23, 1980

INVENTOR(S) : Jacques Helgorsky and Alain Leveque

It is certified that error appears in the above—identified patent and that said Letters Patent is hereby corrected as shown below:

In Column 7, line 15, "$R_1$ and $R_2$" should read

--$R_{13}$ and $R_{14}$--;

line 20, "$R_1$ is hexyl and $R_2$ is oct.1" should read --$R_{13}$ is hexyl and $R_{14}$ is octyl--;

line 23, "$R_1$ and $R_2$" should read --$R_{13}$ and $R_{14}$--.

In Column 8, line 12, immediately preceding the phrase "sulfuric acid" the phrase --nitric acid,-- should be inserted.

In Column 9, after line 49 in the footnote, after "hydroxyquinoline A is a β-alkenyl-8-hydroxyquinoline of the formula" insert the following:

UNITED STATES PATENT AND TRADEMARK OFFICE
CERTIFICATE OF CORRECTION

PATENT NO. : 4,241,029
DATED : December 23, 1980
INVENTOR(S) : Jacques Helgorsky and Alain Leveque It is certified that error appears in the above—identified patent and that said Letters Patent is hereby corrected as shown below:

-- 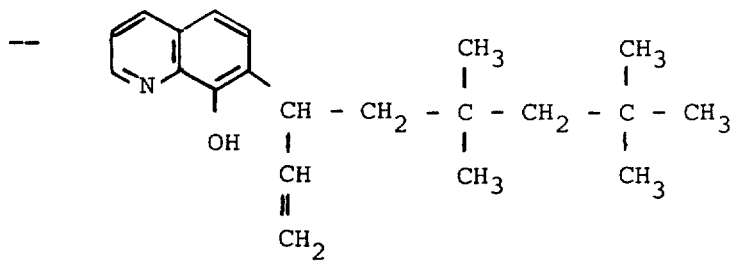

This is the active ingredient of the product marketed by the ASHLAND CHEMICAL CO. under the trademark KELEX 100. -- and delete same from column 10, lines 1-10.

In Column 10, lines 39-44, kindly correct Table 2 to read as follows:

-- TABLE 2

| Degree of Gallium Extraction | | Mixing Time in mn | | | | |
|---|---|---|---|---|---|---|
| | | 2 | 5 | 10 | 30 | 60 |
| x% of the acid | x = 0 (P.T.) | 14 | 31 | 50 | 82 | 90 |
| | x = 1 | 45 | 74 | 87 | 90 | 90 |

--.

UNITED STATES PATENT AND TRADEMARK OFFICE
CERTIFICATE OF CORRECTION

PATENT NO.  : 4,241,029
DATED       : December 23, 1981
INVENTOR(S) : Jacques Helgorsky and Alain Leveque It is certified that error appears in the above-identified patent and that said Letters Patent are hereby corrected as shown below:

In Column 11, line 18, kindly correct "(P.T.)" to read

--(P.I.)--.

In Column 12, lines 51-58, the formula " 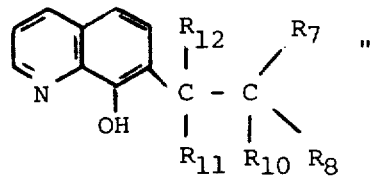 "

in Claim 6 should read -- 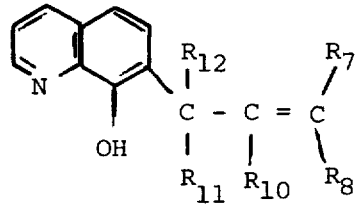 --.

In Column 13, lines 46-47, the formula "R - S - CH - $_2$ - COOH"

should read -- R - S - $CH_2$ - COOH --;

lines 55-57, the formula " 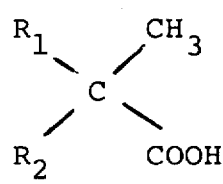 "

in Claim 9 should read -- 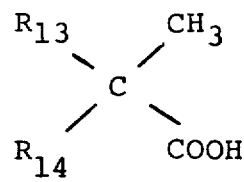 --.

UNITED STATES PATENT AND TRADEMARK OFFICE
CERTIFICATE OF CORRECTION

PATENT NO. : 4,241,029
DATED : December 23, 1980
INVENTOR(S) : Jacques Helgorsky and Alain Leveque It is certified that error appears in the above-identified patent and that said Letters Patent are hereby corrected as shown below:

In Column 14, line 16, "$R_1$ and $R_2$" should read --$R_{13}$ and $R_{14}$--;

line 19, the numeral "19" should be deleted.

Signed and Sealed this

Fifteenth Day of September 1981

[SEAL]

Attest:

GERALD J. MOSSINGHOFF

Attesting Officer

Commissioner of Patents and Trademarks